United States Patent
Lewis et al.

(10) Patent No.: US 11,977,454 B2
(45) Date of Patent: May 7, 2024

(54) LEVERAGING METADATA OF A DEDUPLICATION STORAGE SYSTEM TO PERFORM AN EFFICIENT RESTORE OF BACKUP DATA

(71) Applicant: EMC IP Holding Company LLC, Hopkinton, MA (US)

(72) Inventors: Donna Barry Lewis, Holly Springs, NC (US); Nitin Madan, Cupertino, CA (US); Kedar Sadanand Godbole, Pune (IN); Srikant Viswanathan, Pune (IN); Bhimsen Bhanjois, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/359,916

(22) Filed: Jun. 28, 2021

(65) Prior Publication Data

US 2022/0382647 A1    Dec. 1, 2022

(30) Foreign Application Priority Data

May 27, 2021    (IN) .............................. 202141023620

(51) Int. Cl.
    *G06F 11/00*    (2006.01)
    *G06F 11/14*    (2006.01)
(52) U.S. Cl.
    CPC ...... *G06F 11/1464* (2013.01); *G06F 11/1435* (2013.01); *G06F 11/1451* (2013.01); *G06F 11/1453* (2013.01); *G06F 11/1469* (2013.01)

(58) Field of Classification Search
    CPC ............. G06F 11/1464; G06F 11/1435; G06F 11/1451; G06F 11/1453; G06F 11/1469
    See application file for complete search history.

(56) References Cited

U.S. PATENT DOCUMENTS

| | | | | |
|---|---|---|---|---|
| 9,501,364 B1* | 11/2016 | Bushman | ............ | G06F 16/1752 |
| 10,049,116 B1* | 8/2018 | Bajpai | ................ | G06F 11/1453 |
| 10,353,780 B1* | 7/2019 | O'Connell | ........... | G06F 11/1451 |
| 10,942,779 B1* | 3/2021 | Chopra | ................ | H04L 67/566 |
| 11,307,937 B1* | 4/2022 | Cheng | ................ | G06F 11/1469 |
| 11,507,539 B2* | 11/2022 | Hirsch | ................ | G06F 11/1453 |
| 2003/0145248 A1* | 7/2003 | McNeil | ............... | G06F 11/1451 |
| | | | | 714/13 |

(Continued)

*Primary Examiner* — Loan L. T. Truong
(74) *Attorney, Agent, or Firm* — Dergosits & Noah LLP; Todd A. Noah

(57) ABSTRACT

Described is a system for leveraging incremental backup metadata of a deduplication storage system to perform an efficient data restore. The system may reference metadata stored as part of incremental backup infrastructure to determine only the changes to the data that occurred subsequent to the restore point. As a result, the system may reduce data read processing by retrieving only the changed data from the deduplication storage system. Moreover, the system may reduce the required bandwidth for the restore by providing only the changed data to a target device of the restore. Data retained by the client system such as the current version of the data may then be overwritten with the reduced set of data to complete the restore. As a result, the system may perform an efficient restore by reducing read accesses and bandwidth requirements, and thus, improve overall restore performance.

17 Claims, 5 Drawing Sheets

(56) References Cited

U.S. PATENT DOCUMENTS

| | | | |
|---|---|---|---|
| 2004/0243775 A1* | 12/2004 | Coulter | G06F 11/1451 |
| | | | 714/E11.123 |
| 2006/0026218 A1* | 2/2006 | Urmston | G06F 11/1451 |
| 2006/0265434 A1* | 11/2006 | Kathuria | G06F 11/1469 |
| 2010/0274980 A1* | 10/2010 | Stringham | G06F 11/1451 |
| | | | 711/156 |
| 2013/0238562 A1* | 9/2013 | Kumarasamy | G06F 11/1451 |
| | | | 707/649 |
| 2014/0258237 A1* | 9/2014 | Dinkar | G06F 11/1451 |
| | | | 707/645 |
| 2019/0138342 A1* | 5/2019 | Dornemann | G06F 11/2097 |
| 2020/0042395 A1* | 2/2020 | Chu | G06F 16/24552 |
| 2020/0150897 A1* | 5/2020 | Guturi | G06F 3/067 |
| 2020/0167238 A1* | 5/2020 | Killamsetti | G06F 11/1461 |
| 2020/0409738 A1* | 12/2020 | Naidu | G06F 3/0608 |
| 2021/0117295 A1* | 4/2021 | Sharma | G06F 11/1484 |
| 2021/0133046 A1* | 5/2021 | Yadav | G06F 16/2358 |
| 2021/0157628 A1* | 5/2021 | Dornemann | G06F 11/2097 |
| 2021/0271388 A1* | 9/2021 | Dwarampudi | G06F 3/067 |
| 2021/0349857 A1* | 11/2021 | Mitkar | G06F 3/0608 |
| 2021/0406129 A1* | 12/2021 | Zheng | G06F 16/1756 |
| 2022/0138051 A1* | 5/2022 | Yelheri | G06F 3/0641 |
| | | | 711/162 |
| 2022/0155962 A1* | 5/2022 | Mundra | G06F 11/1451 |
| 2023/0305930 A1* | 9/2023 | Qin | G06F 11/1469 |

* cited by examiner

| Point in Time | Version of File F | Base File | List of Changes |
|---|---|---|---|
| First | F1 | N/A | Entire File (all regions) |
| Second | F2 | F1 | 100-1000, 1800-2100 |
| Third | F3 | F2 | 800-1100, 2200-2400 |
| Fourth | F4 | F3 | 2300-3000 |

FIG. 3

LEVERAGING METADATA OF A DEDUPLICATION STORAGE SYSTEM TO PERFORM AN EFFICIENT RESTORE OF BACKUP DATA

CLAIM OF PRIORITY

This application claims priority to India Patent Application No. 202141023620, filed May 27, 2021, the contents of which is hereby incorporated by reference in their entirety.

TECHNICAL FIELD

This disclosure relates to deduplication storage systems, and more particularly, leveraging metadata to perform an efficient restore of deduplicated backup data.

BACKGROUND

Data storage systems (or on-demand storage services) may provide various tools that are crucial for enterprise level network clients. For example, clients may rely on such systems to efficiently back up and recover data in the event of data loss or various system outage events to allow business applications to remain in service or quickly return to service. As part of a data storage service, providers may have products that allow clients to roll back their data to a previous state by creating point-in-time backups of data. These point-in-time backups may be created using an incremental backup technique. For example, the data storage system may be configured to take advantage of the fact that files created by cloning or otherwise copying existing files have, at least initially, a certain amount of data in common with the file based on which they were created. Deduplication storage systems, for example, may store each data region (e.g. segment) only once, and may for each file that includes a given region include only a pointer to the single stored instance of the region. Accordingly, deduplication storage systems are configured to provide efficiencies for backing up data. However, deduplication storage systems are often not configured to implement high degrees of efficiency for a restore process. For example, when a file is restored from a deduplication storage system, the entirety of the file may be read from backup data. Accordingly, the network capacity usage is equal to the size of the file being read. Moreover, restore performance is often further hindered by the deduplication process itself. For example, as the deduplication ratio increases, backup data may be scattered all over a storage device. Accordingly, the number of data accesses required to restore a certain amount of data may increase due to read amplification (e.g. poor locality). Accordingly, there is a continued need to provide efficient mechanisms for restoring data from a deduplication storage system.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 3 is a diagram illustrating an example of data lineage information that may be leveraged to perform an efficient restore according to one or more embodiments of the disclosure.

DETAILED DESCRIPTION

Figure 1:
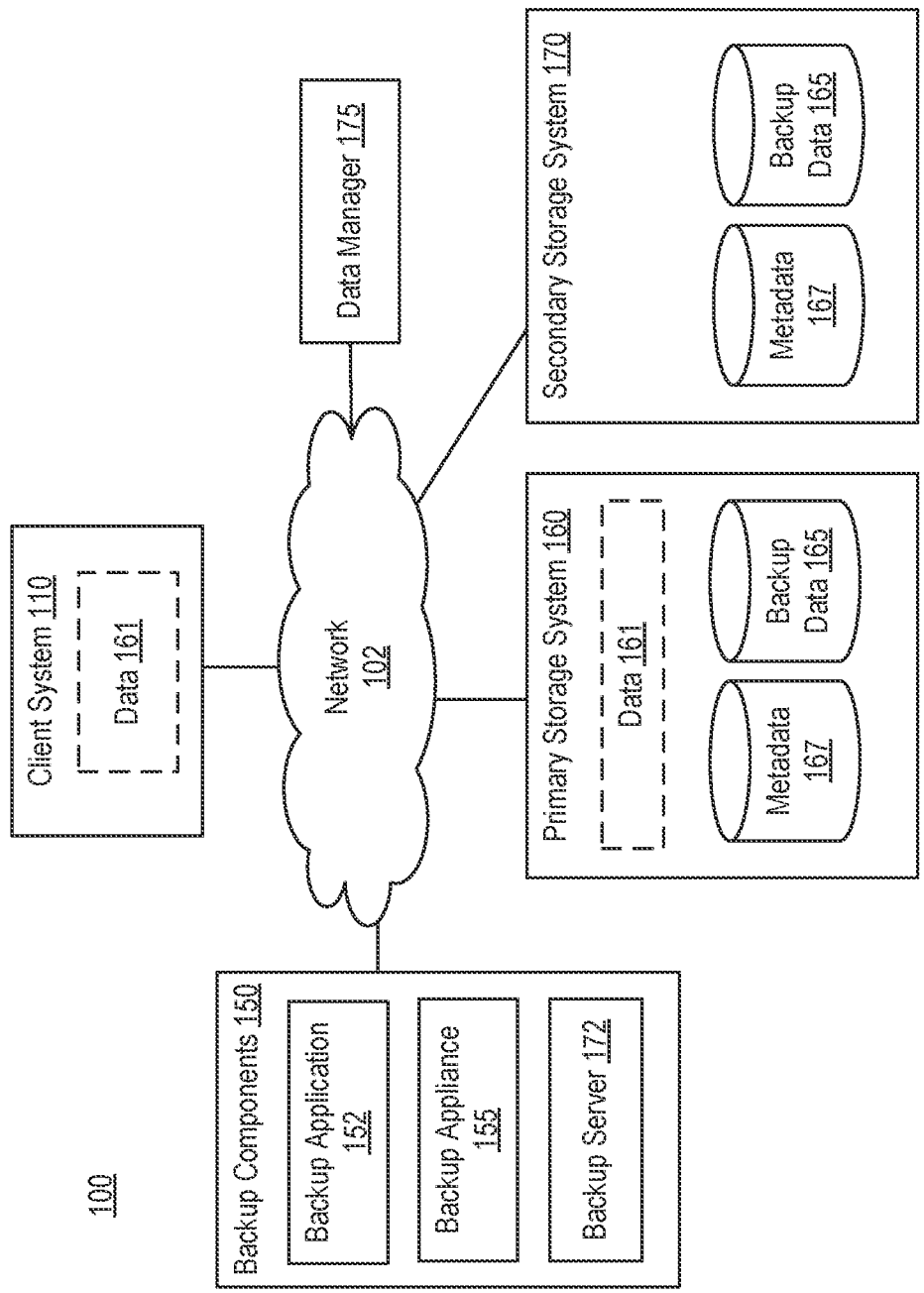
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for leveraging metadata of a deduplication storage system to perform an efficient data restore. In particular, the system may reference such metadata that may be stored as part of an incremental backup infrastructure to determine only the changes to the data that occurred after the restore point. As a result, the system may reduce data read processing by retrieving only the changed data from the deduplication storage system. Moreover, the system may reduce the required bandwidth for the restore by providing only the changed data to a client system (or target device of the restore). Data retained by the client system such as the current version of the data may then be overwritten with the changed data to complete the restore. To further improve efficiency, the system may implement pre-fetching and/or caching techniques when retrieving the reduced amount of data. Accordingly, in some embodiments, the system may perform an efficient restore by reducing read accesses and bandwidth requirements, and thus, improve overall restore performance.

As mentioned, the system may be implemented as part of backup infrastructure that employs incremental backups. For example, to perform an incremental backup, the deduplication storage system may track changes that occur subsequent to the previously performed backup (full or incremental backup). In some embodiments, these changes (or deltas) are used to synthetically create a full or "incremental full" backup (or image). In some embodiments, when performing an incremental backup, the system may employ an efficient copying technique. For example, in some embodiments, the system may implement a "fastcopy" plus overwrite technique (e.g. "FCOW"). For example, a fastcopy operation includes creating a copy of a base file without creating any new data in the deduplication storage system. In other words, the data of the base file is not moved, and instead, references (or pointers) to the data are copied to the newly created file. The system then overwrites the old segments with the new segments in the newly created file. As a result, there are two copies of the file and each of them can be referenced to perform a full recovery. An example of identifying differences between a base file and a next generation of a file is further described, for example, in U.S. Pat. No. 10,372,683, entitled "Method to determine a base file relationship between a current generation of files and a last replicated generation of files," which is incorporated by reference herein in its entirety, and also assigned to EMC IP Holding Company LLC. It should be noted, however, that various other techniques to perform incremental backups and/or to synthetically create a full backup are contemplated.

As described, the system may leverage metadata created by the incremental backup process to perform an efficient restore. For example, the system may leverage the metadata already existing as part of a deduplication storage system at the time of requesting a restore. More specifically, the system leverage data (or file) lineage information to identify changed regions of the file to be restored. However, if such information is not available for a particular restore, the system may rely on alternative metadata such as a fingerprint index (e.g. Merkle Tree). In either scenario, the system may retrieve only the changed regions of data to improve overall restore efficiency.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment that may be used in conjunction with one or more embodiments of the disclosure.

As shown, the environment 100 may include a client system 110, backup components 150, a primary storage system 160, a secondary storage system 170, and a data manager 175. The primary storage system 160 and/or the second storage system 170 may be referred to as the deduplication storage system. It should be noted that the components of operating environment 100 may interact via a network 102, which may be any type of wired or wireless network including a local area network (LAN), a wide area network (WAN), or a direct communication link, or other suitable connection.

In some embodiments, components of the operating environment 100 may provide data protection and recovery services to a client (or customer) associated with the client system 110. For example, these services may include a backup service that includes providing point-in-time backups of data 161 (or snapshots). For example, the system may perform incremental backups at various points in time for data 161 that a client wishes to protect as part of a backup service. These backups may be stored as backup data 165 on storage systems 160/170. The backup data 165 and/or data 161 may be associated with metadata 167 that is also stored by the storage systems 160/170.

Accordingly, the client system (or source system) 110 may act as a client from which data to be backed-up originates. The client system 110 may host (or include, store, etc.) data 161 that may be protected as part of the data protection and recovery service. As shown, in some embodiments, data 161 may also be stored within the primary storage system 160. Accordingly, in some embodiments, data may be backed up (or replicated) from data 161 stored on the client system 110, and/or from the primary storage system 160. For example, production data (e.g. data 161) associated with a client may be stored within a data protection environment provided by the primary storage system 160. In some embodiments, the client system 110 may be considered a host device. In addition, in some embodiments, the client system 110 may be in the form of a VM.

The backup components 150 may include a backup application 152 that performs (or manages, coordinates, etc.) the creation and recovery (or restoration) of data 161 that may be backed-up. For example, data 161 to be backed-up from the client system 110 may be communicated from the client system 110 to the backup application 152 for initial processing, after which the processed data is uploaded from the backup application 152 for storage within the primary storage system 160. In some embodiments, the backup application 152 may cooperate with a backup client application of the client system 110 to back up client data to primary storage system 160. A backup application 152 may also cooperate with a backup client application to restore backup data from the storage systems 160/170 to the client system 110. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

As shown, the operating environment 100 may include a primary storage system 160, and a secondary storage system 170. For example, the primary storage system 160 may be part of a production environment (or production system), and the secondary storage system 170 may be part of a disaster recovery environment, both of which may provide data protection and recovery (or disaster recovery) services to a client (or customer). In some embodiments, the secondary storage system 170 may be a remote storage system (e.g. remote from the primary storage system 160). For example, the primary storage system 160 may be an on-premises system and the secondary storage system 170 may be part of a cloud-based system (or service). In some embodiments, the primary storage system 160 may also be provided as part of a cloud-based system (or service). However, in such scenarios, an entity (e.g. cloud service provider) providing the primary storage system 160 may be different than the entity (or entities) providing the secondary storage system 170. For example, the primary storage system 160 may use underlying storage hardware provided (or managed) by a data protection and backup service provider (e.g. Dell EMC), whereas the underlying storage hardware for the secondary storage system 170 may be provided by a different cloud-based provider for storage services (e.g. Amazon Web Services (AWS), or Microsoft Azure).

The secondary storage system 170 may be configured to provide replication (or recovery, mirroring, etc.) capabilities for the primary storage system 160. As shown, the secondary storage system 170 may also backup data 165 and metadata 167. In some embodiments, data 161 and/or backup data 165 stored on the primary storage system 160 may be replicated to provide a corresponding recovery backup data 165 that is stored on the secondary storage system 170. In some embodiments, the primary storage system 160 may store the most recent backups, and the secondary storage system 170 may store older backups.

It should be noted that the storage systems 160/170 may be implemented using any suitable type of storage resources (or storage platform). In some embodiments, storage systems 160/170 may store data within a storage pool. For example, a storage pool may be a collection of physical storage components. In some embodiments, the primary storage system 160 may include logical unit numbers (LUNs), and consistency groups. In some embodiments, a LUN may be a logical unit of block storage that may be created as part of a storage pool. In some embodiments, a consistency group may include a collection of LUNs that are grouped together so that backup (or snapshot) operations on a consistency group affect all the LUNs contained in the group. As a result, a consistency group provides recovery consistency if one or more LUNs are dependent upon each other.

Although shown as a separate component, the data manager 175 may be part of, or work in conjunction with, storage systems 160/170 (e.g. the deduplication storage system). As further described herein, a data manager 175 may coordinate (or manage, orchestrate, execute, automate, etc.) various operations (or processes, methods, etc.) for performing a restore. In addition, the data manager 175 may be part of, or work in conjunction with, the backup components 150. In addition, in some embodiments, the data manager 175 may direct (or control, initiate, etc.) other components of the operating environment 100, such as the primary storage system 160, to perform various operations.

Figure 2:
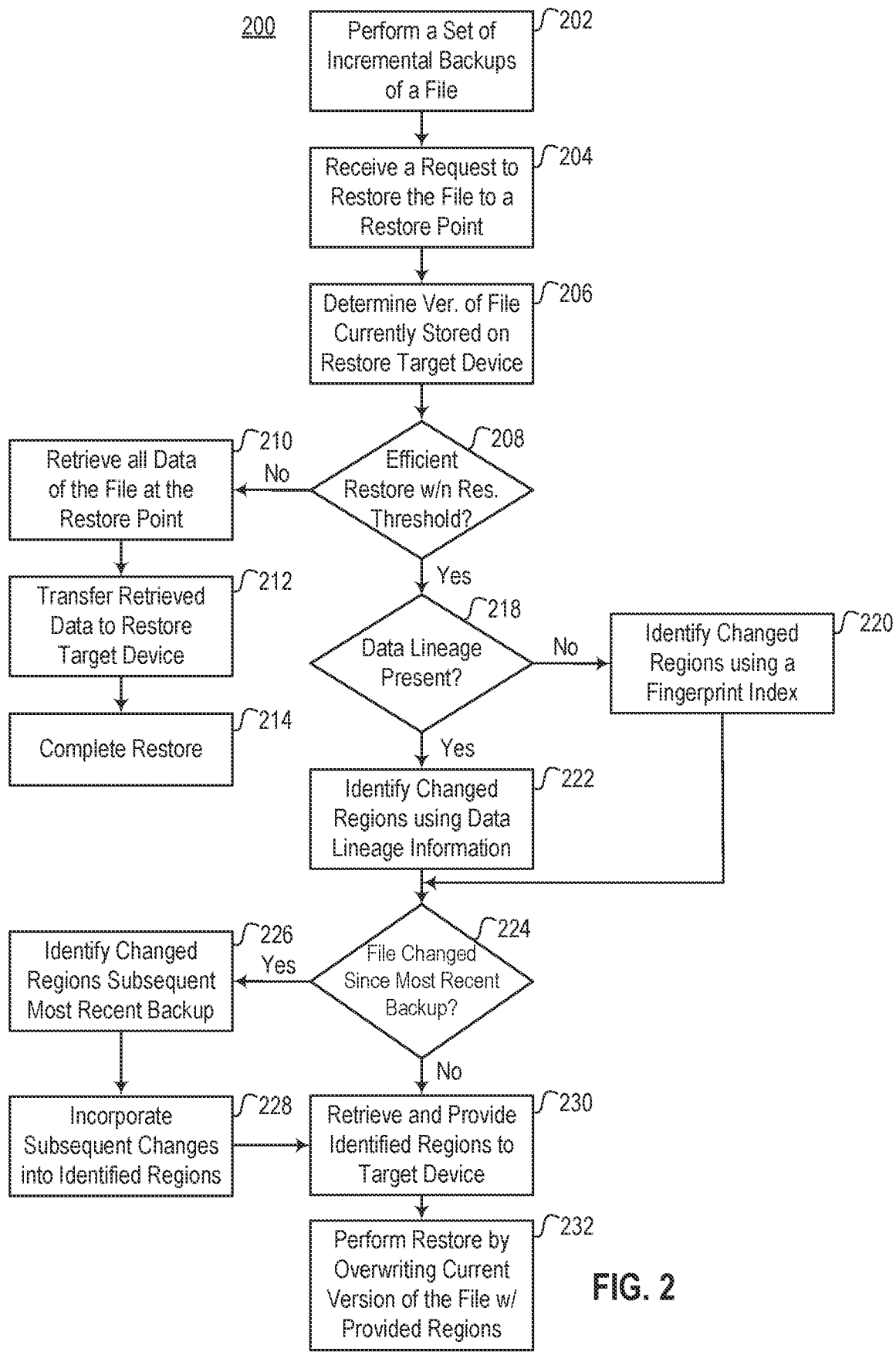
FIG. 2 is a flow diagram illustrating an example process for performing an efficient restore of a file by leveraging metadata according to one or more embodiments of the disclosure.

FIG. 2 is a flow diagram illustrating an example process for performing an efficient restore of a file by leveraging metadata according to one or more embodiments of the disclosure. Process 200 may use processing logic, which may include software, hardware, or a combination thereof. For example, process 200 may be performed by a system including one or more components described in operating environment 100 (e.g. data manager 175, storage system 160/170, etc.).

In 202, the system may perform a set of incremental backups of a file (e.g. data 161) to a deduplication storage system (e.g. storage systems 160/170). The incremental backups may be performed according to a particular backup schedule for backing up the file of a client system (e.g. client system 110). In some embodiments, the file may include a set of files such as an application. In 204, the system may receive a request to restore the file to a restore point. The restore point may be a particular point-in-time of a performed backup (e.g. a full or incremental backup). For example, the system may receive a request to restore a particular file or application to a point-in-time (e.g. restore point) that corresponds to a point-in-time in which an incremental backup was performed. In other words, the system may receive a request to roll back (or revert) the file to a previously performed backup. In 206, the system may determine a version (or instance) of the file retained (or residing, stored, etc.) on the restore target device (e.g. client system), or system associated with the target device (e.g. primary storage system). In other words, the system may determine a version of the file to be restored that is currently retained on the target device (or associated system) at the time of the request. In some embodiments, the current version of the file may include a production version of the file (or instance thereof) to be restored. As described, in some embodiments, a restore target device as referred to herein may include a client system and/or a primary storage system (e.g. primary storage system 160). For example, when the restore target system includes the primary storage system, the file retained on the primary storage system (e.g. production file) may be restored from data retrieved from a secondary storage system (e.g. secondary storage system 170). As described, the file retained by the restore target device at the time of the restore request may be used as base file to which only the changes subsequent to the restore point are retrieved from the deduplication storage system and written to the retained version of the file.

In some embodiments, after receiving the request to perform the restore, the system may determine whether to perform an efficient data restore (e.g. as described in embodiments herein), or a standard restore in which all of the data for the file at the restore point is retrieved from the deduplication storage system. To perform such a determination, in 208, the system may determine whether a resource requirement to perform the efficient restore is within a predetermined threshold. For example, in some scenarios such as when the restore point spans many previous backups, the overhead to perform the efficient restore may negate any performance improvements over performing a standard restore. The resource requirement may be based on an amount of data to read, retrieve, or transfer. For example, the system may determine (or estimate) the number of regions (or amount of data) that potentially differ from the restore point to the current point-in-time. In other words, the system may determine whether the amount of changed data exceeds a predetermined threshold amount of data. In some embodiments, the system may perform a heuristic to determine the number of regions that potentially differ, and thus, an associated resource requirement. In addition, or as an alternative, in some embodiments, the resource requirement may be determined based on an amount of time. Accordingly, the predetermined threshold may be based on a number of days to which the restore point spans. For instance, if the restore point is more than 30 days from the current point-in-time, the system may determine the resource requirements to read, access, and/or transfer the changed data does not warrant performing an efficient restore. Accordingly, if the threshold is not satisfied (e.g. exceeded), the system may revert to a standard restore. More particularly, if the resource requirement is not within the resource requirement threshold, in 210, the system may retrieve all of the data of the file at the restore point from the deduplication storage system, and in 212, transfer all of the retrieved data to the restore target device. For example, if the size of the file (or set of files) at the restore point is 128 MB, the entire 128 MB would be retrieved and/or transferred from the deduplication storage system. In 214, the system may complete the standard restore using the transferred data, which in this scenario includes all of the retrieved data. In other words, the system in this approach does not fully leverage the metadata nor the data retained by the target device at the time of the request. However, if in 208, the system determines the resource requirement of the efficient restore satisfies a resource threshold, the system may proceed to perform an efficient restore.

To perform an efficient restore, the system may determine what type of metadata to leverage. In particular, in 218, the system may determine whether data lineage information is present to perform the particular restore. If so, in 222, the system may identify regions of the file that changed (or differ, were modified, etc.) between the restore point and the most recent backup. An example of such data lineage information and how that information may be used to identify data for an efficient restore is further described with reference to FIG. 3.

FIG. 3 is a diagram illustrating an example of data lineage information 300 stored by a storage system that may be leveraged to perform an efficient restore according to one or more embodiments of the disclosure. In some embodiments, the data lineage information 300 may be stored as part of the metadata (e.g. metadata 167) maintained by the deduplication storage system. For example, this information 300 may be stored when performing a backup process that implements incremental backups. It should be noted that in this example, the information is stored as part of a table, but any data structure is contemplated.

As shown in this example, the data lineage information 300 stores metadata associated with a particular file (e.g. File F) at various points in time. More specifically, the information 300 includes a list of changes 308 between a base file 306 and a version of the file 304 at a point-in-time 302 of a performed backup. As shown, versions of the file, denoted as F1, F2, F3, and F4, represent a version (or state) of File F at first, second, third, and fourth points-in-time respectively. In this example, the points-in-time correspond to an initial full backup (e.g. at a first point-in-time) and three subsequent incremental backups (e.g. at second, third, and fourth points-in-time). Accordingly, the first point-in-time corresponds to a full back up, and thus, F1 is not associated with a base file, and the list of changes includes the entire file (e.g. all regions of File F). At the second point-in-time, an incremental backup is performed, and the list of changes specifies that regions 100-1000, and 1800-2100 have changed since the last backup. In other words, the list of changes for the second point-in-time specifies the changes between base file F1 (e.g. File F at the first point-in-time) and F2 (e.g. File F and the second point-in-time) are regions 100-1000, and 1800-2100. Similarly, at a third point-in-time, another incremental backup is performed, and the list of changes specifies that regions 800-1100, and 2200-2400 have changed between base file F2 and F3 (e.g. File F at the third point-in-time). Finally, at the fourth point-in-time, another incremental backup is performed, and the list of changes specifies that regions 2300-3000 have changed between base file F3 and F4 (e.g. File F at the fourth point-in-time). In some embodiments, the list of changes 308 may specify the offsets of the file that have changed. However, any format may be used to identify changed regions of the file, and a region may include any format to divide a file (or sets of files) such as chunks, fragments, segments, blocks, etc.

As described, the system may use this data lineage information 300 to identify only the changed regions of a file for an efficient restore. For example, suppose the data lineage information 300 includes up-to-date information for the currently performed backups for File F, and the system receives a request (or instruction) to restore (e.g. roll back) File F to a restore point of the second point-in-time (e.g. F2). Put another way, the request is to roll back File F to the incremental backup at the second point-in-time or to F2. In response, the system may reference the data lineage information 300 to identify the changes to File F between the second point-in-time and the most recently performed backup, which in this example, is the incremental backup performed at the fourth point-in-time. To determine the changed regions, the system determines the changed regions between the second point-in-time (F2) and the fourth point-in-time (F4) including any changes from incremental backups performed therebetween (or intermediate backups), which in this example, includes the incremental backup performed at the third point-in-time (F3). In other words, the system may "walk back" or reverse the changed regions to determine which regions to retrieve from the backup data stored as part of the incremental backup performed at the second point-in-time (or restore point backup). Accordingly, in this example, the system would determine that the changed regions between F3 and F4 include regions 2300-3000, and the changed regions between F2 and F3 include regions 800-1100, and 2200-2400. Accordingly, the system may combine these regions by performing a union operation that results in a set of regions (or a first set of regions) that include regions 800-1100, and 2200-3000. Thus, the system has identified the set of regions that changed between the incremental backup performed at the second point-in-time and the most recent backup from the data lineage information 300. Accordingly, as further described herein, only these regions may be retrieved from the backup data of the incremental backup performed at the second point-in-time when performing an efficient restore. In other words, only regions 800-1100, and 2200-3000 of F2 are retrieved. These regions may then be used to overwrite a version of File F currently retained on the restore target device. For example, if the version of File F currently residing on the restore target device corresponds to the most recent incremental backup (or F4), such a version of the File may be restored to the restore point by overwriting the File with the retrieved regions 800-1100, and 2200-3000.

It should be noted that in some scenarios, at the time of the request to restore, File F may have changed since the most recent backup. In other words, the changes that occur subsequent to the most recent backup (e.g. a second set of regions) may not yet be captured by a backup. Accordingly, as further described below, these changes may also be tracked and incorporated (or combined) with the set of regions (e.g. the first set of regions) identified from the data lineage information 300. This incorporated (or combined) set of regions may then be used to overwrite the current version of File F to complete the efficient restore.

Returning to FIG. 2, if in 218, the system determines data lineage information is not available, the system may proceed to use alternative metadata. In particular, in 220, the system may identify regions of the file that changed between the restore point and the most recent backup by referencing a fingerprint index. The fingerprint index may be an index that stores a fingerprint (or digest, hash value, etc.) of each region (or chunk, block, segment, etc.) of a file. The index may be represented in any suitable manner such as a tree (e.g. Merkle Tree). For example, a tree structure may be utilized to improve the ability for the system (e.g. or filesystem thereof) to enumerate (or traverse) the index. In some embodiments, the fingerprint index may be stored as part of the metadata (e.g. metadata 167) maintained by the deduplication storage system. To identify the changed regions, the system may compare the fingerprint index of the file at the restore point with the fingerprint index of the file at the most recent backup. For example, the system may enumerate these indexes and perform a comparison to determine which fingerprints are different. Accordingly, the system may identify the regions with different fingerprints as the regions that changed between the restore point and the most recent backup.

Accordingly, in some embodiments, when identifying the changed regions, the system does not have to perform a comparison between the actual restore point backup data (or backup file) and the most recent backup data. Instead, the system may identify the changed regions of the file by exclusively using metadata (e.g. metadata alone). Moreover, such metadata may already exist at the time of the restore request. For example, such metadata may already be created as part of performing the incremental backups.

In some embodiments, the system may further improve the efficiency of the restore process by prefetching or caching the indexes, regions of a file, or a combination of both. For example, when identifying the changed regions (e.g. in operations 220 and/or 222), the system may at the same time (e.g. as a parallel operation, thread, etc.) retrieve the changed regions from the backup corresponding to the restore point and store them in a cache. Accordingly, when performing the restore, the system may efficiently access the cached regions without performing additional operations to retrieve the required regions. In some embodiments, the system may also pre-fetch or cache one or more fingerprint indexes. For example, the system may cache the fingerprint index of one or more of the most recent backups of the file (e.g. the last three versions of the file backed up). Accordingly, these fingerprint indexes may be cached prior to the restore request to further improve efficiency.

As described, in some scenarios, at the time of the restore request, the file may have changed since the most recent backup. For example, the changes that occur subsequent to the most recent backup may not yet be captured by a backup. Accordingly, in 224, the system may determine whether the file has changed since the most recent backup. If so, in 226, the system may identify the changed regions subsequent to the most recent backup. In some embodiments, the system may identify these changes from change information maintained by the deduplication storage system, the restore target device (e.g. client system and/or primary storage system), or a combination of both. For example, the change tracking information may include change block tracking (CBT) information maintained as part of the incremental backup infrastructure.

Once these changes are identified, in 228, the system may incorporate these changes (e.g. a second set of regions) with the changes identified in operations 220 and/or 222 (e.g. a first set of regions). For example, the system may perform a union operation to incorporate these changes.

Once all of the changed regions have been identified for the file, in 230, the system may retrieve the identified regions from a backup of the file at the restore point (restore point backup) and provide these regions to the restore target device. In other words, the retrieved regions may include the original regions of the restore point backup that were identified as having changed. In some embodiments, this may include retrieving only the identified regions from the restore point backup. In other words, the system may refrain from accessing or reading the regions of the restore point backup that have not changed. If necessary, the regions identified as having changed subsequent to the most recent backup may also be retrieved from the deduplication storage system and/or the target device that may track and store these changes as part of the backup infrastructure.

As described, the system may conserve bandwidth by transferring only the changed regions to the target device. For example, the changed regions may be transferred from the deduplication storage system to a client system, which is the target device. In addition, or as an alternative, the changed regions may be transferred from a secondary storage system to a primary storage system, which is the target device. For instance, the primary storage system may store a production version of the file, and the file may be backed up (or replicated) to the secondary storage system. As yet another example, the most recent backup may be stored on a primary storage system and earlier backups may be stored on the secondary storage system. Accordingly, in such a configuration, the changed regions may be transferred from the secondary storage system to the primary storage system, which initiates a restore on the client system.

In 232, the system may initiate the restore that includes overwriting the current version of the file with the provided changed regions. For example, the current version of the file (or instance thereof) residing on the target device may be overwritten with the provided regions. Accordingly, the system may leverage data retained by the restore target device and metadata maintained as part of an increment backup infrastructure to perform an efficient restore.

It should be noted that process 200 describes an example for restoring a file (or set of files). However, process 200 may be used to restore other types of data within various backup environments. For example, instead of restoring a file, the system may restore a LUN by retrieving only the changed data after a backup (or snapshot) of the restore point. As another example, the system may restore a VM by retrieving only the changed data after a backup (or snapshot) of the restore point.

In addition, in some embodiments, the system may perform a specialized processing for sparse files. For example, when restoring a sparse file, an existing base file may not be needed to retrieve only the regions of the file that store actual data. Accordingly, the system may use the same operations as described above using an empty file as the base file. In such a scenario, the changed regions will only be those regions containing actual data within the sparse file. By implementing such a technique, the system avoids retrieving the complete file where only zeroes (e.g. empty data) are returned for the sparse regions. Instead, the system may read (or access) only the regions that store actual data.

Figure 4:
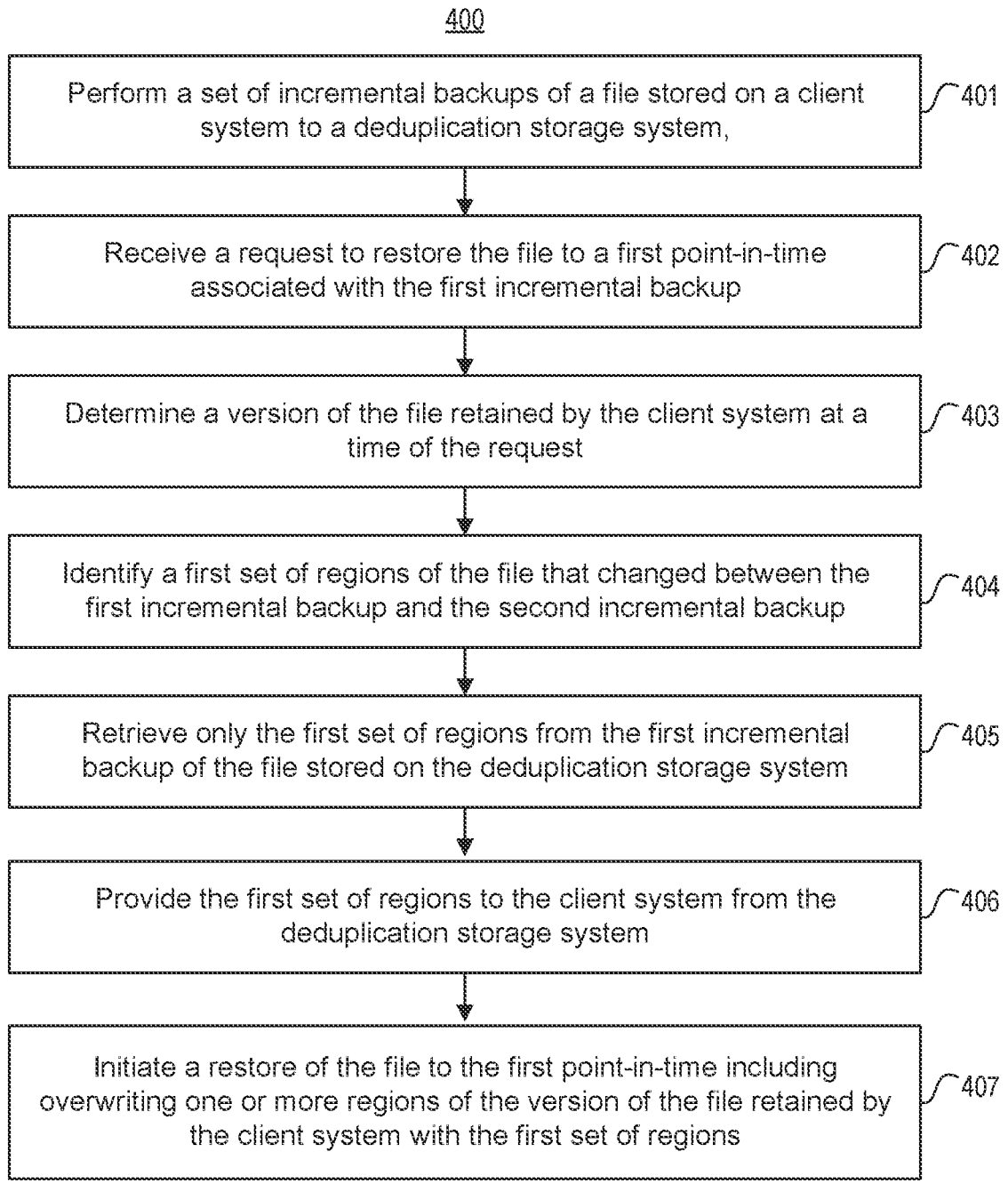
FIG. 4 is a process flow diagram illustrating an example method of performing an efficient restore of a file according to one or more embodiments of the disclosure.

FIG. 4 is a flow diagram illustrating an example method of performing an efficient restore of a file according to one or more embodiments of the disclosure. Process 400 may use processing logic, which may include software, hardware, or a combination thereof. For example, process 400 may be performed by a system including one or more components described in operating environment 100 (e.g. data manager 175, storage system 160/170, etc.).

In 401, the system may perform a set of incremental backups of a file stored on a client system (e.g. client system 110) to a deduplication storage system (e.g. storage system 160 and/or 170). The set of incremental backups may include at least a first incremental backup of the file and a second incremental backup of the file after the first incremental backup. Using the example described in FIG. 3, the first incremental backup of the file may correspond to the incremental backup performed at a second point-in-time, and the second incremental backup may correspond to the incremental backup performed at the fourth point-in-time. In some embodiments, the deduplication storage system may include a primary storage system (e.g. storage system 160) and a secondary storage system (e.g. storage system 170). For example, the second incremental backup of the file (e.g. most recent backup) may be stored on the primary storage system and the first incremental backup of the file (e.g. older backup) may be stored on the secondary storage system. In some embodiments, the second incremental backup corresponds to a most recent backup performed. For example, the most recent backup may be determined at the time of a request to restore the file (e.g. in operation 402).

In 402, the system may receive a request to restore the file to a first point-in-time associated with the first incremental backup. In other words, the request may be to request to roll back to the file to the first point-in-time. In some embodiments, the request may be to restore the file to a restore target device or system (e.g. client system and/or primary storage system).

In 403, the system may determine a version of the file retained by the client system (e.g. restore target device) at a time of the request to restore the file (or restore request). In some embodiments, the version of the file retained by the client system represents a current version of the file stored on the client system at the time of the request.

In 404, the system may identify a first set of regions of the file that changed between the first incremental backup and the second incremental backup. In some embodiments, the deduplication storage system maintains data lineage information (e.g. data lineage information 300) including a list of changed regions (e.g. list of changed regions 308) of the file between each of the incremental backups performed. For example, data lineage information may be stored as part of each backup of the performed set of backups. Accordingly, in some embodiments, identifying the first set of regions includes accessing the data lineage information to identify the list of changed regions of the file between the first incremental backup and the second incremental backup as the first set of regions. Continuing with the example described in FIG. 3, the list of changed regions of the file between the first incremental backup and the second incremental backup includes regions 800-1100, and 2200-3000.

In some embodiments, identifying the list of changed regions of the file between the first incremental backup and the second incremental backup as the first set of regions may include determining a third incremental backup was performed between the first incremental backup and the second incremental backup. Continuing with the example described in FIG. 3, the third incremental backup of the file may correspond to the incremental backup performed at a third point-in-time. Accordingly, in some embodiments, the system may incorporate the changed regions between the first incremental backup and the third incremental backup, and the third incremental backup and the second incremental backup, as part of the first set of regions. In some embodiments, identifying the first set of regions may include performing a union operation of the list of changed regions between two or more incremental backups.

As described, in some embodiments, instead of using data lineage information, the system may use alternative metadata. Accordingly, in some embodiments, identifying the first set of regions of the file that changed between the first incremental backup and the second incremental backup may include determining data lineage information to restore the file to the first point-in-time is not available (or not present). For example, the system may determine a list of changed regions for the third incremental backup (e.g. an incremental backup performed between the first and second incremental backups) is not available. For example, the backup data and associated metadata for the third incremental backup data may have been deleted (e.g. in response to being expired). Accordingly, the system may identify the first set of regions based on a fingerprint index. More particularly, in some embodiments, identifying the first set of regions of the file may also include comparing fingerprints of regions of the file at the first point-in-time with fingerprints of regions of the file at the second point-in-time, and identifying, based on the comparison, the regions with different fingerprints as the first set of regions. As described, the fingerprints of the regions (or file) may be stored as part of a fingerprint index.

As described, in some scenarios, the file may have changed between the most recent backup and the time of the restore request. Accordingly, in some embodiments, the system may also identify a second set of regions of the file that changed between the second incremental backup and the time of the request. Accordingly, the system may also incorporate the second set of regions as part of the identified first set of regions (e.g. using a union operation).

In some embodiments, identifying the second set of regions may include identifying the second set of regions from change tracking information maintained by the deduplication storage system and/or client system. For example, the change tracking information may include changes to the file not yet stored as part of the set of incremental backups.

As described, in some embodiments, the system may determine whether to continue with an efficient restore, or revert to a standard restore. Accordingly, in some embodiments, the system may determine a resource requirement to restore the file to the first point-in-time using only the first set of regions satisfies a predetermined resource threshold. As described, the resource requirement may be based on an amount of data to read, retrieve, or transfer. For example, the system may determine the amount of changed data does not exceed a predetermined threshold amount of data. In addition, in some embodiments, the resource requirement may be determined based on an amount of time. For example, the predetermined resource threshold may be based on a number of days that have elapsed since the first point-in-time.

In 405, the system may retrieve only the first set of regions from the first incremental backup of the file stored on the deduplication storage system. In some embodiments, the system may retrieve the first set of regions from the deduplication storage system without reading the regions of the file at the first point-in-time that have not changed since performing the first incremental backup.

In 406, the system may provide the first set of regions to the client system from the deduplication storage system. For example, the system may conserve bandwidth by transferring only the changed regions to the restore target device. As described, the restore target device may include the client system. However, in some embodiments, the restore target device may include the primary storage system.

In 407, the system may initiate a restore of the file to the first point-in-time including overwriting one or more regions of the version of the file retained by the client system (e.g. restore target system) with the first set of regions.

Accordingly, in some embodiments, the system may perform an efficient restore by leveraging deduplication metadata.

Figure 5:
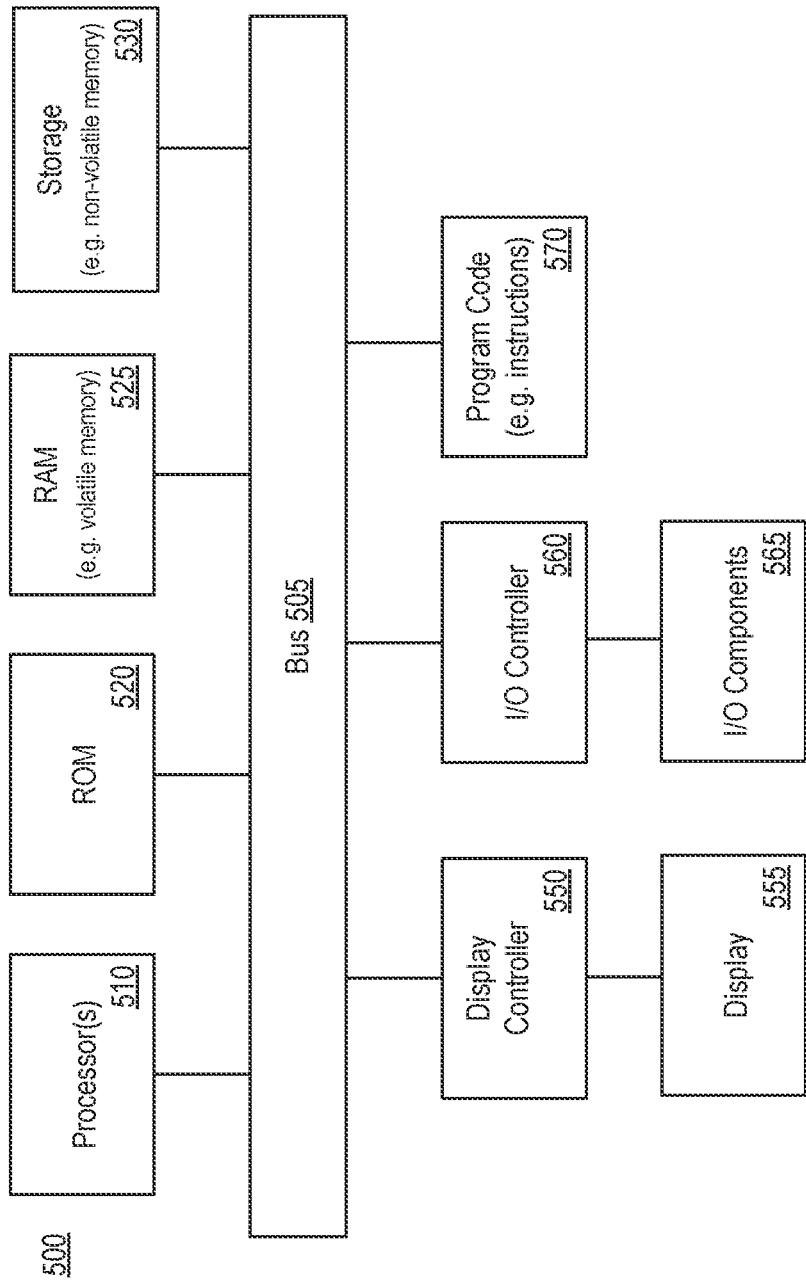
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. client system 110, storage systems 160/170, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. data manager 175, storage systems 160/170, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer-readable medium storing a plurality of instructions, which when executed, cause the one or more processors to:
perform a set of incremental backups of a file stored on a client system to a deduplication storage system, the set of incremental backups including at least a first incremental backup of the file stored on a secondary storage system and a second incremental backup of the file, created after the first incremental backup, and stored on a primary storage system;
receive a request to restore the file to a first point-in-time associated with the first incremental backup;
determine a current version of the file retained at the client system at a time that the request to restore the file to the first point-in-time was received;
identify a first set of regions of the file that changed between the first incremental backup associated with the first point-in-time and the second incremental backup associated with a second point-in-time, and a second set of regions of the file that changed between the second incremental backup and the time of the request;
retrieve only the first set of regions from the first incremental backup of the file stored on the secondary storage system, and only the second set of regions from the second incremental backup of the file stored on the a primary storage system;
provide the first set of regions to the client system from the secondary storage system, and the second set of regions to the client system from the primary storage system; and
initiate a restore of the file to the first point-in-time by overwriting regions of the current version of the file currently retained by the client system which correspond to the first set of regions of the file that changed between the first incremental backup and the second incremental backup, and which correspond to the second set of regions of the file that changed between the second incremental backup and the time of the request.

2. The system of claim 1, wherein the second incremental backup corresponds to a most recent backup performed at the time of the request, and the version of the file retained by the client system represents a current version of the file stored on the client system at the time of the request.

3. The system of claim 1, wherein identifying the second set of regions of the file that changed between the second incremental backup and the time of the request includes: identifying the second set of regions from change tracking information maintained by the primary storage system, the change tracking information including changes to the file not yet stored as part of the set of incremental backups.

4. The system of claim 1, wherein the deduplication storage system maintains data lineage information including a list of changed regions of the file between each of the incremental backups performed, and
identifying the first set of regions includes accessing the data lineage information to identify the list of changed regions of the file between the first incremental backup and the second incremental backup as the first set of regions.

5. The system of claim 1, wherein identifying the first set of regions of the file that changed between the first incremental backup and the second incremental backup includes:
comparing fingerprints of regions of the file at the first point-in-time with fingerprints of regions of the file at the second point-in-time; and
identifying, based on the comparison, the regions with different fingerprints as the first set of regions.

6. The system of claim 1, wherein the plurality of instructions, when executed, further cause the one or more processors to: determine a resource requirement to restore the file to the first point-in-time using only the first set of regions and the second set of regions satisfies a predetermined resource threshold.

7. The system of claim 1, wherein the first set of regions are retrieved from the secondary storage system without reading the regions of the file at the first point-in-time that have not changed since performing the first incremental backup.

8. A method comprising:
performing a set of incremental backups of a file stored on a client system to a deduplication storage system, the set of incremental backups including at least a first incremental backup of the file stored on a secondary storage system and a second incremental backup of the file, created after the first incremental backup, and stored on a primary storage system;
receiving a request to restore the file to a first point-in-time associated with the first incremental backup;
determining a current version of the file retained at the client system at a time that the request to restore the file to the first point-in-time was received;
identifying a first set of regions of the file that changed between the first incremental backup associated with the first point-in-time and the second incremental backup associated with a second point-in-time, and a second set of regions of the file that changed between the second incremental backup and the time of the request;

retrieving only the first set of regions from the first incremental backup of the file stored on a secondary storage system, and only the second set of regions from the second incremental backup of the file stored on the primary storage system;

providing the first set of regions to the client system from the secondary storage system, and the second set of regions to the client system from the primary storage system; and initiating a restore of the file to the first point-in-time by overwriting regions of the current version of the file currently retained by the client system which correspond to the first set of regions of the file that changed between the first incremental backup and the second incremental backup, and which correspond to the second set of regions of the file that changed between the second incremental backup and the time of the request.

9. The method of claim 8, wherein the second incremental backup corresponds to a most recent backup performed at the time of the request, and the current version of the file retained by the client system represents a current version of the file stored on the client system at the time of the request.

10. The method of claim 8, wherein identifying the second set of regions of the file that changed between the second incremental backup and the time of the request includes:

identifying the second set of regions from change tracking information maintained by the primary storage system, the change tracking information including changes to the file not yet stored as part of the set of incremental backups.

11. The method of claim 8, wherein the deduplication storage system maintains data lineage information including a list of changed regions of the file between each of the incremental backups performed, and identifying the first set of regions includes accessing the data lineage information to identify the list of changed regions of the file between the first incremental backup and the second incremental backup as the first set of regions.

12. The method of claim 8, wherein identifying the first set of regions of the file that changed between the first incremental backup and the second incremental backup includes:

comparing fingerprints of regions of the file at the first point-in-time with fingerprints of regions of the file at the second point-in-time; and identifying, based on the comparison, the regions with different fingerprints as the first set of regions.

13. A computer program product comprising a non-transitory computer-readable medium having a computer-readable program code embodied therein to be executed by one or more processors, the program code including instructions to:

perform a set of incremental backups of a file stored on a client system to a deduplication storage system, the set of incremental backups including at least a first incremental backup of the file stored on a secondary storage system and a second incremental backup of the file, created after the first incremental backup, and stored on a primary storage system;

receive a request to restore the file to a first point-in-time associated with the first incremental backup;

determine a current version of the file retained at the client system at a time that the request to restore the file to the first point-in-time was received;

identify a first set of regions of the file that changed between the first incremental backup associated with the first point-in-time and the second incremental backup associated with a second point-in-time, and a second set of regions of the file that changed between the second incremental backup and the time of the request;

retrieve only the first set of regions from the first incremental backup of the file stored on a secondary storage system, and only the second set of regions from the second incremental backup of the file stored on the primary storage system;

provide the first set of regions to the client system from the secondary storage system, and the second set of regions to the client system from the primary storage system; and initiate a restore of the file to the first point-in-time by overwriting regions of the current version of the file currently retained by the client system which correspond to the first set of regions of the file that changed between the first incremental backup and the second incremental backup, and which correspond to the second set of regions of the file that changed between the second incremental backup and the time of the request.

14. The computer program product of claim 13, wherein the second incremental backup corresponds to a most recent backup performed at the time of the request, and the current version of the file retained by the client system represents a current version of the file stored on the client system at the time of the request.

15. The computer program product of claim 13, wherein identifying the second set of regions of the file that changed between the second incremental backup and the time of the request includes:

identifying the second set of regions from change tracking information maintained by the storage system, the change tracking information including changes to the file not yet stored as part of the set of incremental backups.

16. The computer program product of claim 13, wherein the deduplication storage system maintains data lineage information including a list of changed regions of the file between each of the incremental backups performed, and identifying the first set of regions includes accessing the data lineage information to identify the list of changed regions of the file between the first incremental backup and the second incremental backup as the first set of regions.

17. The computer program product of claim 13, wherein identifying the first set of regions of the file that changed between the first incremental backup and the second incremental backup includes:

comparing fingerprints of regions of the file at the first point-in-time with fingerprints of regions of the file at the second point-in-time; and identifying, based on the comparison, the regions with different fingerprints as the first set of regions.

* * * * *